United States Patent
Xue et al.

(10) Patent No.: US 9,467,043 B2
(45) Date of Patent: Oct. 11, 2016

(54) BUCK DC-DC CONVERTER WITH FIXED FREQUENCY

(71) Applicant: Micrel, Inc., San Jose, CA (US)

(72) Inventors: Dashun Xue, Austin, TX (US);
William MacLean, Austin, TX (US)

(73) Assignee: Micrel, Inc., San Jose, CA (US)

( * ) Notice: Subject to any disclaimer, the term of this patent is extended or adjusted under 35 U.S.C. 154(b) by 70 days.

(21) Appl. No.: 14/226,548

(22) Filed: Mar. 26, 2014

(65) Prior Publication Data

US 2015/0280557 A1     Oct. 1, 2015

(51) Int. Cl.
*H02M 3/157* (2006.01)
*H02M 3/156* (2006.01)
*H02M 1/00* (2006.01)
*H02M 3/158* (2006.01)

(52) U.S. Cl.
CPC ............. *H02M 3/156* (2013.01); *H02M 3/157* (2013.01); *H02M 3/158* (2013.01); *H02M 3/1588* (2013.01); *H02M 2001/0012* (2013.01); *Y02B 70/1466* (2013.01)

(58) Field of Classification Search
USPC .................................................. 323/270–285
See application file for complete search history.

(56) References Cited

U.S. PATENT DOCUMENTS

| | | | |
|---|---|---|---|
| 5,747,976 A | 5/1998 | Wong et al. | |
| 7,482,791 B2 | 1/2009 | Stoichita et al. | |
| 7,482,793 B2 * | 1/2009 | Stoichita | 323/282 |
| 7,902,805 B2 | 3/2011 | Gibson et al. | |
| 8,203,321 B2 * | 6/2012 | Liang | H02M 3/1584 323/272 |
| 8,283,907 B1 * | 10/2012 | Jayaraj | 323/282 |
| 2012/0153917 A1 * | 6/2012 | Adell et al. | 323/283 |
| 2012/0274296 A1 * | 11/2012 | Higuchi et al. | 323/282 |

* cited by examiner

*Primary Examiner* — Timothy J Dole
*Assistant Examiner* — Bryan R Perez
(74) *Attorney, Agent, or Firm* — Van Pelt, Yi & James LLP

(57) ABSTRACT

A buck switching regulator implements a fixed frequency feedback control circuit including a voltage control loop and a frequency control loop to regulate the switching frequency of the buck switching regulator to a fixed or nearly fixed frequency. The voltage control loop, implementing ripple mode control, is configured to control the power switches in response to the switching regulator output voltage or a signal related to the switching regulator output voltage. The frequency control loop, implementing a phase-locked loop control scheme, is configured to adjust the on-time of the high-side switch so as to regulate the switching frequency to be equal to or be proportional to the reference frequency.

15 Claims, 4 Drawing Sheets

BUCK DC-DC CONVERTER WITH FIXED FREQUENCY

BACKGROUND OF THE INVENTION

Switch mode power supplies or switching regulators, also referred to as DC to DC converters, are often used to convert an input supply voltage to a desired output voltage at a voltage level appropriate for the internal circuitry of an integrated circuit. For example, a 5 volts supply voltage provided to an integrated circuit may need to be reduced to 2.8 volts on the IC chip to operate the internal circuitry on the chip. A switching regulator provides power supply function through low loss components such as capacitors, inductors, and transformers, and power switches that are turned on and off to transfer energy from the input to the output in discrete packets. A feedback control circuit is used to regulate the energy transfer to maintain a constant output voltage within the desired load limits of the circuit.

A switching regulator can be configured to step up the input voltage or step down the input voltage or both. Specifically, a buck switching regulator, also called a "buck converter," steps down the input voltage while a boost switching regulator, also called a "boost converter," steps up the input voltage. A buck-boost switching regulator, or buck-boost converter, provides both step-up and step-down functions.

The operation of the conventional buck switching regulator is well known and is generalized as follows. A conventional buck switching regulator includes a pair of power switches which are turned on and off to regulate an output voltage to be proportional to a reference voltage. More specifically, the power switches are alternately turned on and off to generate a switching output voltage at a switching output node, also referred to as the switch node. The switch node is coupled to an LC filter circuit including an output inductor and an output capacitor to generate an output voltage having substantially constant magnitude. The output voltage can then be used to drive a load.

In particular, the pair of power switches is often referred to as including a "high-side power switch" and a "low-side power switch." The high-side power switch is turned on to apply energy to the output inductor of the output filter circuit to allow the current through the inductor to build up. When the high-side power switch is turned off, the voltage across the inductor reverses and the current through the inductor reduces during this period. As a result, the inductor current ripples above and below the nominal output current. A relatively constant output voltage is maintained by the output capacitor. The low-side power switch is turned on and off for synchronous control operation.

FIG. 1 is a schematic diagram of a conventional buck switching regulator. Referring to FIG. 1, a switching regulator 1 includes a pair of power switches S1 and S2 configured to receive an input voltage $V_{IN}$ and are alternately turned on and off to generate a switching output voltage $V_{SW}$ at a switch node (SW) 22. The switching output voltage $V_{SW}$ is directly coupled to an LC filter circuit including an output inductor L1 and an output capacitor $C_{OUT}$ to generate a regulated output voltage $V_{OUT}$ at a node 26 having a substantially constant magnitude. The output voltage $V_{OUT}$ can then be used to drive a load 30 whereby switching regulator 1 provides the load current $I_{LOAD}$ to maintain the output voltage $V_{OUT}$ at a constant level.

Switching regulator 1 includes a feedback control circuit to regulate the energy transfer to the LC filter circuit to maintain the constant output voltage within the desired load limits of the circuit. More specifically, the feedback control circuit causes power switches S1 and S2 to turn on and off to regulate the output voltage $V_{OUT}$ to be proportional to a reference voltage $V_{REF}$ or to a voltage value related to the reference voltage $V_{REF}$. In the present embodiment, a voltage divider including resistors R1 and R2 is used to divide down the output voltage $V_{OUT}$ which is then fed back to the switching regulator 1 as a feedback voltage $V_{FB}$ on a feedback node 28. The feedback voltage $V_{FB}$ is compared with the reference voltage $V_{REF}$ at an error comparator 12. The comparator output is coupled to a controller and gate drive circuit 14 to generate control voltages for the power switches based on a switching regulator control scheme. The control voltages are used to generate gate drive signals for the power switches S1 and S2. The gate drive signal for the high-side power switch S1 is coupled to a high-side driver circuit 18 while the gate drive signal for the low-side power switch S2 is coupled to a low-side driver circuit 20. Driver circuits 18, 20 convert the respective gate drive signals to gate drive voltages appropriate for turning on and off the respective power switches.

Buck switching regulators or "buck regulators" with fixed on-time control are preferred in the industry for some important advantages as good efficiency for light load in PFM (pulse frequency modulation) mode, easy synchronization with external signals, easy control of a relatively large off-time and a very small fixed on-time to regulate a high input voltage to a low output voltage. Fixed on-time (or constant on-time) regulators are one type of voltage regulators employing ripple-mode control where the output voltage is regulated based on the ripple component in the output signal. Buck switching regulators implementing ripple-mode control are sometimes referred to as hysteretic buck regulators or hysteretic DC-DC converters. Because of the switching action at the power switches, all switch-mode regulators generate an output ripple current through the switched output inductor. This current ripple manifests itself as an output voltage ripple due, principally, to the equivalent series resistance (ESR) in the output capacitors placed in parallel with the load. The ESR of the output capacitor $C_{OUT}$ is denoted as a resistor $R_{ESR}$ in FIG. 1. Recently, low ESR capacitors are preferred to realize improved efficiency in switching regulators but the low ESR capacitors do not generate enough output ripple for feedback control. In that case, a ripple injection circuit (not shown in FIG. 1) is used to introduce the ripple signal used in the feedback loop. U.S. Pat. Nos. 7,482,791 and 7,482,793 illustrate examples of ripple injection circuits that can be applied in buck regulators using fixed on-time control.

FIG. 2 is a voltage waveform illustrating the output voltage ripple on the feedback voltage $V_{FB}$ of a constant on-time voltage regulator. In operation, a constant on-time (or fixed on-time) regulator switches the output inductor high for a fixed on-time (Ton) when the output ripple falls below a single reference point $V_{REF}$. At the end of the fixed on-time, even if the output ripple may still be below the single reference point, the output inductor is switched low for a minimum off-time before getting switched back high for the fixed on-time again. In the feedback control loop, the output voltage ripple on the feedback voltage $V_{FB}$ is regulated so that the valley of the voltage ripple essentially sits at the reference voltage level ($V_{REF}$), as shown in FIG. 2. The voltage ripple at the feedback node 28 increases for the fixed on-time (Ton) when the high-side power switch is turned on and the voltage ripple at feedback node 28 decreases when the high-side power switch is turned off, and the low side switch is turned on, until the feedback voltage $V_{FB}$ reaches the reference voltage $V_{REF}$.

Although constant on-time buck switching regulator presents many advantages, the constant on-time control scheme results in a switching output voltage $V_{SW}$ that has a varying switching frequency. In some applications, the varying switching frequency of the buck converter is undesirable and a fixed or constant switching frequency is sometimes desired. More specifically, the constant on-time switching regulator has a fixed on-time for the high-side switch but the off-time can vary depending on the load and other condition. The fixed on-time and the varying off-time lead to a varying switching period. The switching frequency of the constant on-time buck converter thus varies over the course of the operation of the converter, such as due to load conditions, or temperature or voltage variations.

BRIEF DESCRIPTION OF THE DRAWINGS

Various embodiments of the invention are disclosed in the following detailed description and the accompanying drawings.

DETAILED DESCRIPTION

Figure 1:
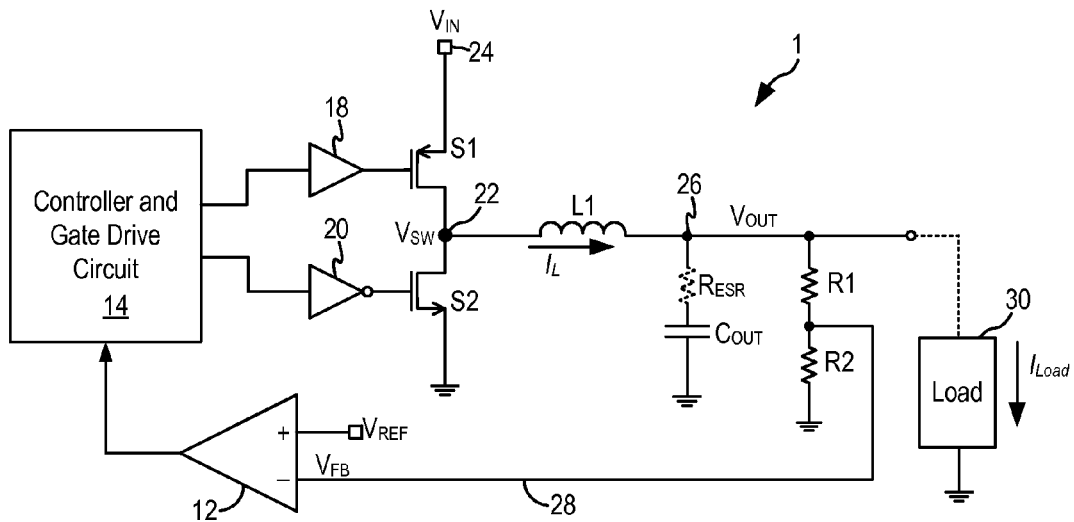
FIG. 1 is a schematic diagram of a conventional buck switching regulator.
Figure 2:
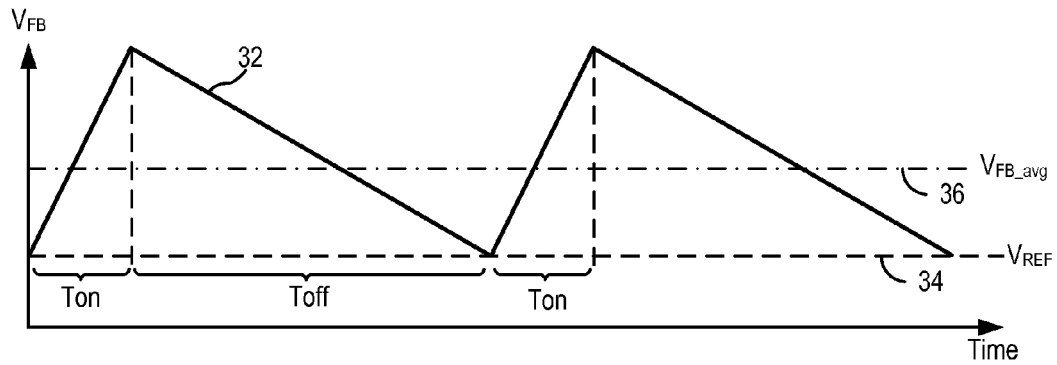
FIG. 2 is a voltage waveform illustrating the output voltage ripple on the feedback voltage $V_{FB}$ of a constant on-time voltage regulator.

The invention can be implemented in numerous ways, including as a process; an apparatus; a system; and/or a composition of matter. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, a buck switching regulator implements a fixed frequency feedback control circuit including a voltage control loop and a frequency control loop to regulate the switching frequency of the buck switching regulator to a fixed or nearly fixed frequency. The voltage control loop, implementing ripple mode control, is a feedback control loop configured to control the power switches in response to the switching regulator output voltage or a signal related to the switching regulator output voltage. The frequency control loop, implementing a phase-locked loop control scheme, is a feedback control loop configured to adjust the on-time of the high-side switch so as to regulate the switching frequency to be equal to or be proportional to the reference frequency. As thus configured, the voltage control loop provides the buck switching regulator with fast transient response while the frequency control loop regulates the switching frequency to a fixed frequency value.

In general, the buck switching regulator operates to turn on and off the high-side power switch at a given duty cycle to obtain the desired regulated output voltage. As used herein, the duty cycle of the high-side power switch refers to the percentage of one switching period in which the high-side power switch is turned on where one switching period refers to the time it takes for the high-side power switch to complete one on-and-off cycle. In embodiments of the present invention, the voltage control loop of the buck switching regulator adjusts the duty cycle of the high-side power switch in relation to the reference voltage to generate the desired output voltage. Meanwhile, the frequency control loop of the buck switching regulator determines when the high-side power switch should be turned off after the switch is turned on. Accordingly, the frequency control loop controls the on-time of the high-side power switch in relation to a reference frequency. The on-time of the high-side power switch is thus not fixed as in the case of a constant on-time switching regulator. Rather, the on-time of the high-side power switch is regulated or modified to achieve a constant or fixed switching frequency. In operation, the voltage control loop activates the high-side power switch when demanded to provide output current to service the load so as to maintain the regulated output voltage. Meanwhile, the frequency control loop monitors the switching frequency and adjusts the on-time of the high-side power switch to bring the switching frequency of the switching regulator to within a given range of the reference frequency. In particular, the switching frequency is regulated to be equal to or be proportional to the reference frequency.

Figure 3:
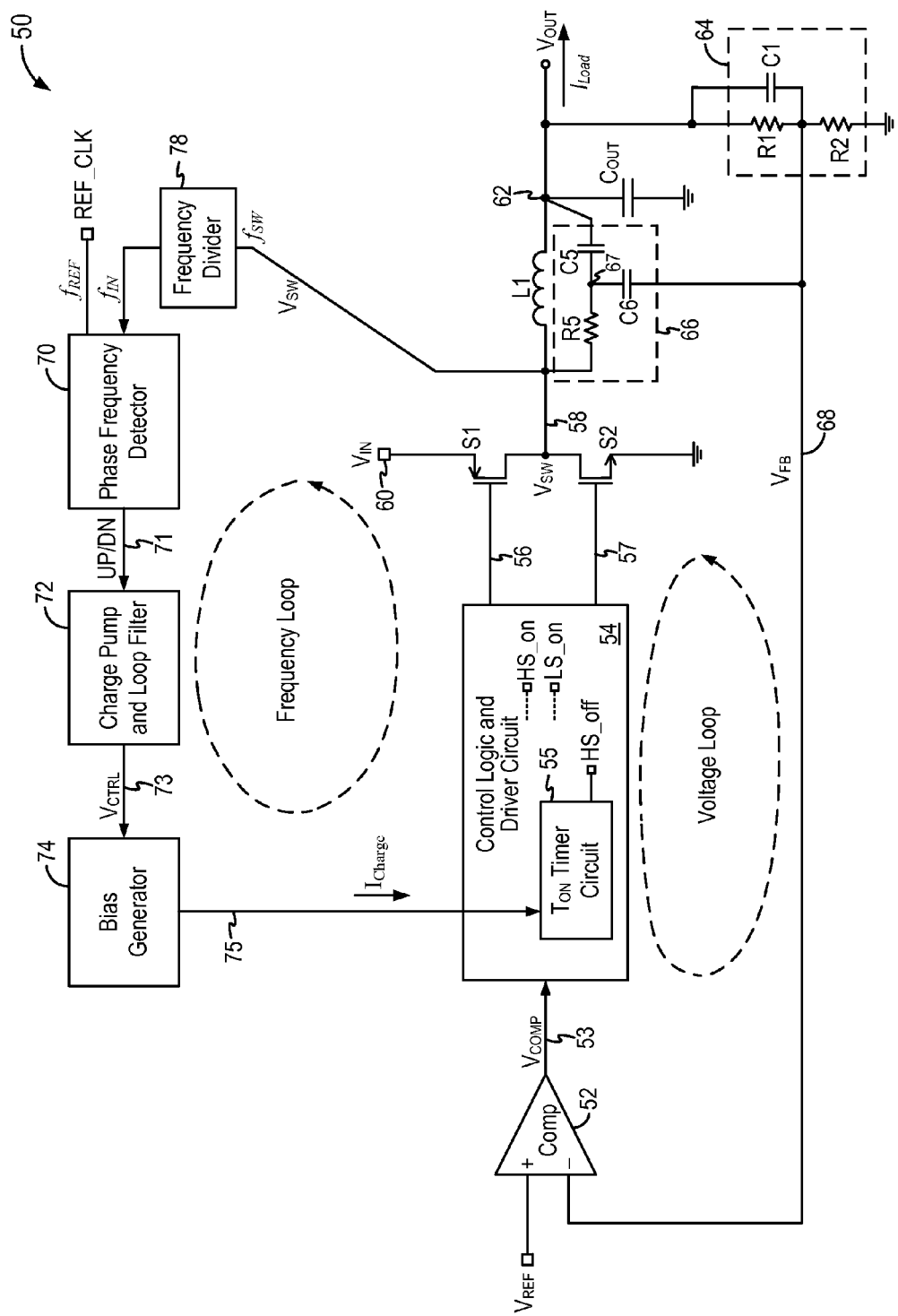
FIG. 3 is a schematic diagram illustrating a buck switching regulator incorporating a fixed frequency feedback control circuit in embodiments of the present embodiment.

FIG. 3 is a schematic diagram illustrating a buck switching regulator incorporating a fixed frequency feedback control circuit in embodiments of the present embodiment. Referring to FIG. 3, a switching regulator 50 includes a pair of power switches S1 and S2 connected in series between an input voltage $V_{IN}$ (node 60) and a ground potential. Power switches S1 and S2 (or "switches S1 and S2") are alternately turned on and off to generate a switching output voltage $V_{SW}$ at a switch node 58. The switching output voltage $V_{SW}$ is directly coupled to an LC filter circuit including an output inductor L1 and an output capacitor $C_{OUT}$ to generate a regulated output voltage $V_{OUT}$ at a node 62 having a substantially constant magnitude. The output voltage $V_{OUT}$ can then be used to drive a load whereby switching regulator 50 provides a load current $I_{LOAD}$ to maintain the output voltage $V_{OUT}$ at a constant level.

Switching regulator 50 includes a feedback control circuit to regulate the energy transfer to the LC filter circuit to maintain the constant output voltage within the desired load limits of the circuit. More specifically, the feedback control circuit causes power switches S1 and S2 to turn on and off to regulate the output voltage $V_{OUT}$ to be proportional to a reference voltage $V_{REF}$ or to a voltage value related to the reference voltage $V_{REF}$. In embodiments of the present invention, the fixed frequency feedback control circuit in the switching regulator 50 implements a variable on-time, fixed frequency feedback control scheme using a voltage control loop and a frequency control loop. The voltage control loop operates in response to the ripple components in the feedback signal to regulate the output voltage while the frequency control loop regulates the switching frequency to within a desired frequency range.

In particular, the voltage control loop of the switching regulator 50 implements ripple mode control using a modified constant on-time feedback control scheme. More specifically, a control logic and driver circuit 54 ("controller 54") generates the gate drive signals for turning on and off the power switches S1 and S2. Under the modified constant on-time feedback control scheme, the controller 54 turns on the high-side power switch S1 when the feedback signal $V_{FB}$ falls below the reference voltage $V_{REF}$. At the end of a given on-time, even if the feedback signal is still below the reference point, the high-side power switch S1 is turned off for a minimum off-time before getting switched back on for another on-time cycle. Thus, the inductor current and the output ripple increase for the on-time (Ton) when the high-side power switch is turned on; meanwhile, the inductor current and the output ripple decreases when the high-side power switch S1 is turned off until the feedback signal of the feedback control loop reaches the reference voltage $V_{REF}$. In switching regulator 50, the on-time of the high-side power switch S1 is not fixed but rather is varied to set a desired fixed switching frequency, as will be described in more detail below.

To implement ripple mode control, the feedback control circuit relies on the ripple components in the feedback signal to regulate the output voltage. In some examples, an output voltage ripple is generated by using an output capacitor $C_{OUT}$ having a sufficiently large equivalent series resistance (ESR). However, capacitors with large ESR are generally more costly and also introduce ripples to the output voltage $V_{OUT}$ itself. In embodiments of the present invention, the output capacitor $C_{OUT}$ is implemented using a capacitor with low or zero ESR so that output voltage ripple and output voltage variation at the output voltage $V_{OUT}$ is minimized. Instead, a ripple generation circuit 66 is used to generate an internal ripple signal which is injected to the feedback control loop of the switching regulator 50. In the present embodiment, the ripple generation circuit 66 generates a ripple voltage signal using the switching output voltage $V_{SW}$ and the ripple voltage signal is injected to the feedback signal $V_{FB}$ (node 68).

In the voltage control loop of the switching regulator 50, the feedback control circuit includes a gain circuit 64 to generate a feedback voltage signal $V_{FB}$ (node 68). The gain circuit 64 may have a gain of one or less than one. In some embodiments, the gain value for the gain circuit 64 may be 1 or 0.5, for example. The ripple generation circuit 66 injects the ripple voltage signal to the feedback voltage signal $V_{FB}$ (node 68), illustrated by the use of an adder in FIG. 3. The use of an adder in FIG. 3 is symbolic only and in actual implementation, the ripple signal may be injected using other circuit configurations with or without an actual adder circuit.

FIG. 3 illustrates an exemplary implementation of the ripple generation circuit 66 and the gain circuit 64. In the present embodiment, the ripple generation circuit is implemented using a resistor R5 and a capacitor C5 connected in series across the output inductor L1, that is, between nodes 58 and 62. A capacitor C6 connects to the common node 67 and the feedback voltage signal $V_{FB}$ (node 68). The resistor R5, capacitors C5 and C6 operate to inject a ripple signal into the feedback voltage node 68. The ripple generation circuit 66 shown in FIG. 3 is illustrative only and the exact construction of the ripple generation circuit 66 is not critical to the practice of the present invention. Other circuits for generating and injecting a ripple signal to the feedback voltage node may be used in other embodiments of the present invention.

In the present embodiment, the gain circuit 64 is implemented as a voltage divider. The gain circuit 64 is formed by resistors R1 and R2 connected in series between the output voltage node 62 and the ground potential. The common node 68 between resistors R1 and R2 is the feedback signal $V_{FB}$ which includes the DC voltage component generated from the output voltage $V_{OUT}$ and the injected ripple signal. A capacitor C1 is connected in parallel with resistor R1. The voltage divider ratio for the gain circuit can be 1 or less than 1.

In the voltage control loop of switching regulator 50, the feedback voltage signal $V_{FB}$ carries the DC voltage component of the output voltage $V_{OUT}$ and the injected ripple signal generated from the switching output voltage $V_{SW}$. The feedback voltage signal is coupled to a comparator 52 to be compared with a reference voltage $V_{REF}$. The feedback voltage signal $V_{FB}$ is coupled to the negative input terminal of comparator 52 while the reference voltage $V_{REF}$ is coupled to the positive input terminal of comparator 52. In the present embodiment, the comparator 52 compares the feedback voltage signal $V_{FB}$ to the reference voltage signal $V_{REF}$ without hysteresis. The comparator 52 generates the comparator output signal $V_{COMP}$ (node 53). The comparator output signal $V_{COMP}$ is coupled to the controller 54 to generate the driver signals for the power switches in accordance with the variable on-time, fixed frequency feedback control scheme.

In embodiments of the present invention, the control logic and driver circuit 54 generates a high-side turn-on signal (HS_on) which is coupled to control the gate terminal (node 56) of the high-side power switch S1. The control logic and driver circuit 54 also generates a low-side turn-on signal (LS_on) which is coupled to control the gate terminal (node 57) of the low-side power switch S2. The high-side turn-on signal and the low-side turn-on signal are complementary of each other so that only one power switch is turned on at a time and the two power switches are never turned on at the same time. In some cases, the high-side turn-on signal and the low-side turn-on signal using non-overlapping clock signals to ensure a given delay between the turning off of one switch and the turning on of the other switch. It is understood that the high-side turn-on signal and the low-side turn-on signal have logical stages appropriate for turning on or off the power switches, depending on the polarities of the power switches. The high-side turn-on signal HS_on is asserted to turn on the high-side power switch S1 while the low-side turn-on signal LS_on is asserted to turn on the low-side power switch S2. The logical states for asserting the high-side and low-side turn-on signals may be logical high or logical low and the two turn-on signals may have the same or opposite signal polarities for the asserted state of the signals. The logical state (high or low) for asserting the high-side or low-side turn on signal is a function of the polarities (NMOS or PMOS) of the respective power switches.

In embodiments of the present invention, the control logic and driver circuit 54 incorporates an on-time (Ton) timer circuit 55. The Ton timer circuit 55 controls the on-time of the high-side power switch in response to a frequency control signal from the frequency control loop, as will be described in more detail below. In particular, the control logic and driver circuit 54 asserts the high-side turn-on signal HS_on to turn on the high-side power switch S1 in response to the comparator output signal $V_{COMP}$ and the Ton timer circuit 55 generates a high-side turn off signal (HS_off) to deassert the high-side turn-on signal HS_on to turn off the high-side power switch, as will be explained in more detail below.

To realize the fixed frequency feedback control scheme, switching regulator 50 includes a frequency control loop which implements a phase-locked loop control scheme. The frequency control loop receives an input signal having an input clock frequency $f_{IN}$ and a reference clock signal REF_CLK having a reference frequency $f_{REF}$. The input signal is derived from the switching output voltage $V_{SW}$. The input frequency $f_{IN}$ is related to the switching frequency $f_{SW}$ of the switching output voltage $V_{SW}$ or proportional to the switching frequency $f_{SW}$. The frequency control loop is configured to generate an output signal (node 75) having a value to cause the input signal ($f_{IN}$) to have a fixed relation to the phase of the reference clock signal ($f_{REF}$). In this manner, the switching frequency $f_{SW}$ of the switching regulator 50 is regulated to be equal to or proportional to the reference frequency $f_{REF}$.

The frequency control loop of the switching regulator 50 includes a phase frequency detector 70, a charge pump and loop filter 72, and a bias generator 74. The phase frequency detector 70 receives the input signal with input frequency $f_{IN}$ and the reference clock signal REF_CLK with the reference frequency $f_{REF}$. In one embodiment, the input signal is the switching output voltage $V_{SW}$ or a replica of the switching output voltage and the input frequency $f_{IN}$ is the switching frequency $f_{SW}$. In some embodiments, a frequency divider 78 may be used to divide down the switching frequency $f_{SW}$ and supply the divided down switching frequency $f_{SW}$ as the input frequency $f_{IN}$. The use of frequency divider 78 is optional and may be omitted in other embodiments of the present invention.

As thus configured, the phase frequency detector detects the phase difference between the input frequency $f_{IN}$ and the reference frequency $f_{REF}$. The phase difference is used to control the charge pump 72 which drives a control voltage node 73 to generate a control voltage $V_{CTRL}$. The control voltage node 73 is coupled to the loop filter, typically a low-pass filter, to filter out high frequency changes at the control voltage $V_{CTRL}$. The control voltage $V_{CTRL}$ is coupled to control a bias generator 74 which generates an output signal (node 75) related to the control voltage $V_{CTRL}$. The output signal (node 75) of the bias generator 74 is coupled to the control logic and driver circuit 54 of the switching regulator 50 to modulate the switching frequency of the switching regulator. In this manner, the switching regulator 50 behaves as a voltage-controlled oscillator in a phase-locked loop circuit and generates the switching frequency $f_{SW}$ as a function of the control voltage $V_{CTRL}$.

In the present embodiment, the frequency control loop generates a frequency correction signal in the form of a current signal $I_{Charge}$. The current $I_{Charge}$ (node 75) is coupled to the on-time (Ton) timer circuit 55 in the control logic and driver circuit 54 to realize the fixed-frequency feedback control scheme. The current $I_{Charge}$ modulates the on-time of the high-side power switch so as to achieve a constant or fixed switching frequency at the switching output voltage $V_{SW}$. In one embodiment, the current $I_{Charge}$ is used to control the time to turn off the high-side power switch S1, there by controlling the on-time of the high-side power switch which controls the switching frequency of the switching regulator 50.

The operation of the fixed frequency feedback control circuit including the voltage control loop and the frequency control loop is as follows. When the output voltage $V_{OUT}$ falls below the reference voltage $V_{REF}$, the comparator 52 asserts the comparator output signal $V_{COMP}$ and the control logic and driver circuit 54 asserts the high-side turn-on signal HS_on to turn on the high-side power switch S1. The control logic and driver circuit 54 also deasserts the low-side turn-on signal LS_on to turn off the low-side power switch S2. In the present example, the control logic and driver circuit 54 asserts the high-side turn-on signal HS_on to a logical low level to turn on the PMOS power switch S1 and deasserts the low-side turn-on signal LS_on to a logical low level to turn off the NMOS power switch S2. With the high-side power switch S1 turned on, the current through the inductor L1 builds up. After a given on-time period Ton, the high-side turn-on signal is deasserted and the high-side power switch S1 is turned off (the low-side power switch S2 being turned on). When the high-side power switch S1 is turned off, the voltage across the inductor L1 reverses and the current flows from the inductor to the output capacitor $C_{OUT}$ and the load. A relatively constant output voltage $V_{OUT}$ is maintained by the output capacitor. The low-side power switch is turned on and off for synchronous control operation.

As the high-side power switch S1 is being turned on and off under the control of the voltage control loop, the switching output voltage $V_{SW}$ switches at a switching frequency $f_{SW}$. The switching frequency $f_{SW}$ or a signal related to the switching frequency $f_{SW}$ is coupled to the phase frequency detector 70 to be compared against the reference clock frequency $f_{REF}$. The phase frequency detector 70 detects the phase difference between the reference frequency $f_{REF}$ and input frequency $f_{IN}$ and generates the current $I_{Charge}$ proportional to the phase difference. The current $I_{Charge}$ is provided to the Ton timer circuit 55 to modulate the on-time of the high-side power switch in order to maintain a fixed phase relationship between the switching frequency and the reference frequency.

In switching regulator 50, the voltage control loop controls the duty cycle of the high-side power switch and the frequency control loop controls the on-time of the high-side power switch. In this manner, the voltage control loop is able to provide fast transient response to handle changing load conditions quickly while the frequency control loop gradually brings the switching frequency back to the desired frequency level. The buck switching regulator 50 is particularly advantages in power management applications which require a DC-DC converter to have fixed switching frequency and fast load transient response.

Figure 4:
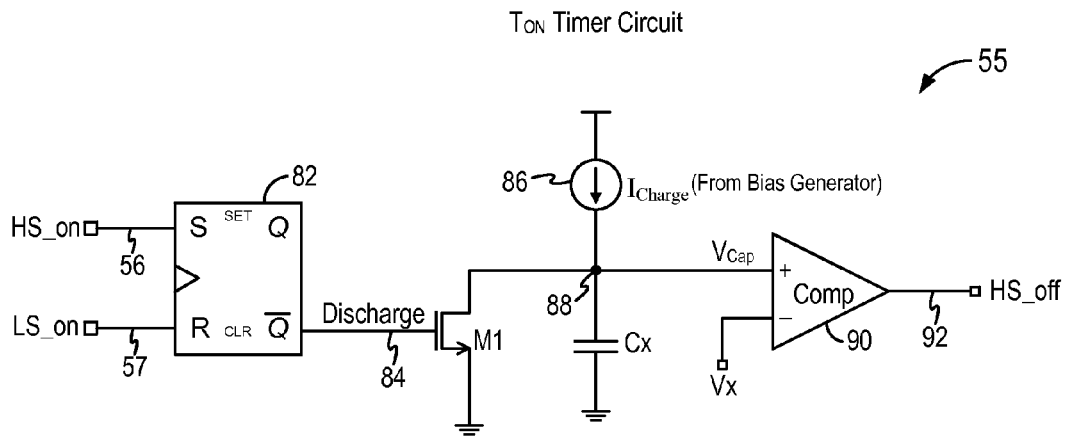
FIG. 4 is a circuit diagram illustrating an on-time (Ton) timer circuit which can be incorporated in the switching regulator of FIG. 3 in embodiments of the present invention.

FIG. 4 is a circuit diagram illustrating an on-time (Ton) timer circuit which can be incorporated in the switching regulator of FIG. 3 in embodiments of the present invention. The on-time Ton timer circuit 55 is incorporated in the control logic and driver circuit 54 of the switching regulator 50 of FIG. 3 to control the time when the high-side power switch is to be turned off in response to the frequency control loop. Referring to FIG. 4, the Ton timer circuit 55 receives the current $I_{Charge}$ from the frequency control loop. In particular, the current $I_{Charge}$ is generated by the bias generator 74 in response to the control signal $V_{CTRL}$ generated by the charge pump and loop filter 72 in the frequency control loop. The Ton timer circuit 55 also receives the high-side turn-on signal HS_on (node 56) and the low-side turn-on signal LS_on (node 57) as input signals. More specifically, the Ton timer circuit 55 includes a SR-flip-flop (or Set-Reset-flip-flop) 82. The high-side turn-on signal is coupled to the Set input and the low-side turn-on signal is coupled to the Reset input of the SR-flip-flop 82. The SR-flip-flop 82 generates the Discharge signal on its negative output terminal Q\(node 84).

The Ton timer circuit 55 further includes a timing capacitor Cx and a comparator 90 forming a timing circuit. The timing capacitor Cx is charged by the current $I_{Charge}$, represented by a current source 86. In actual implementation, the current $I_{Charge}$ is generated by the bias generator 74 in the frequency control loop. The timing capacitor Cx is discharged by an NMOS transistor M1 controlled by the Discharge signal (node 84). By the action of the charging and discharging of the timing capacitor Cx, a capacitor voltage $V_{CAP}$ is developed at the top plate (node 88) of the timing capacitor Cx. The capacitor voltage $V_{CAP}$ is coupled to the positive input terminal of the comparator 90. At the comparator 90, the capacitor voltage $V_{CAP}$ is compared with a timer reference voltage Vx which is coupled to the negative input terminal of the comparator. The comparator 90 generates a high-side turn-off signal HS_off as the output signal on output node 92. The HS_off signal is provided to the circuitry of the control logic and driver circuit to instruct the control logic to turn off the high-side power switch.

Figure 5:
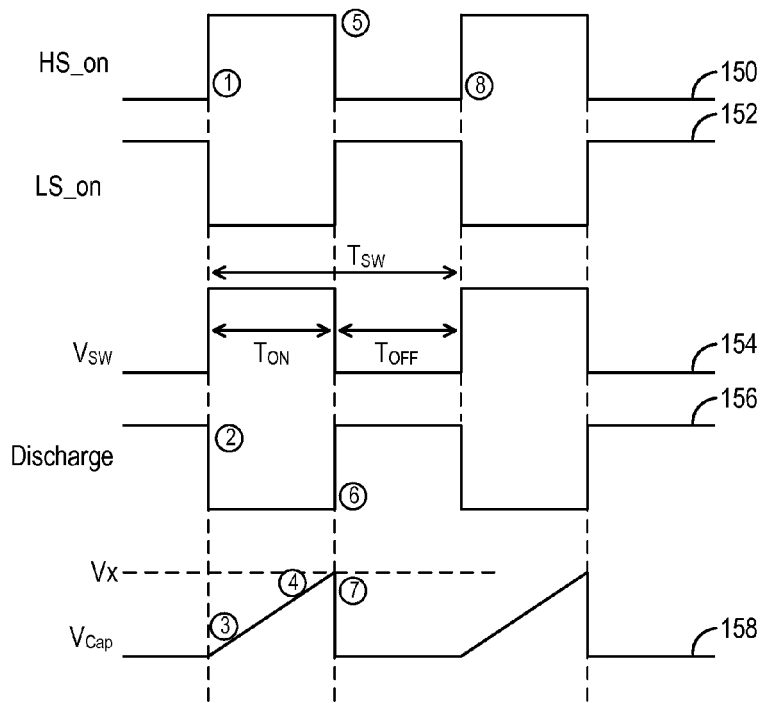
FIG. 5 illustrates waveforms of signals associated with the Ton timer circuit 55 in some example.

The operation of the Ton timer circuit 55 of FIG. 4 will be explained with reference to the timing diagram in FIG. 5. FIG. 5 illustrates waveforms of signals associated with the Ton timer circuit 55 in some example. Referring to FIG. 5, the high-side turn-on signal HS_on (curve 150) and the low-side turn-on signal LS_on (curve 152) are complementary signals. That is, one turn-on signal is asserted while the other turn-on signal is deasserted. In the present example, it is assumed that a logical high level indicates assertion of the turn-on signals and a logical low level indicates deassertion of the turn-on signal. The actual logical level used to drive the power switches may have the same or opposite polarities as the signal waveform shown in FIG. 5. The polarities of the signal waveforms shown in FIG. 5 are illustrative only. Furthermore, in practice, the high-side turn-on signal HS_on (curve 150) and the low-side turn-on signal LS_on (curve 152) are usually non-overlapping signals to ensure that the two turn-on signals are not asserted at the same time.

When the high-side turn-on signal HS_on (curve 150) is asserted, the switching output voltage $V_{SW}$ (curve 154) is driven high by the high-side switch. When the low-side turn-on signal LS_on (curve 152) is asserted, the switching output voltage $V_{SW}$ (curve 154) is driven low by the low-side switch. Thus, the switching output voltage $V_{SW}$ has a switching period $T_{SW}$ defined by the on-time Ton and the off-time Toff of the high-side power switch. The switching period $T_{SW}$ defines a switching frequency $f_{SW}$. The Discharge signal is deasserted during the high-side switch on-time Ton and is asserted during the high-side switch off-time Toff. Accordingly, the timing capacitor Cx is charged up during the high-side switch on-time Ton and is discharged during the high-side switch off-time.

In operation, when high-side switch is turned on (denoted by "1" in FIG. 5) in response to the voltage control loop, the Discharge signal is deasserted ("2") and timing capacitor Cx is allowed to charge up in response to the current $I_{Charge}$ from the frequency control loop ("3"). When the capacitor voltage $V_{CAP}$ reaches the voltage Vx ("4"), the comparator 90 in the Ton timer circuit 55 asserts the HS_off signal which is provided to the controller 54 to turn off the high-side switch ("5"). Thus, the high-side turn-on signal is deasserted while the low-side turn-on signal is asserted and the Discharge signal is asserted ("6"). With the Discharge signal being asserted, the timing capacitor Cx is discharged by transistor M1 to ground and the voltage $V_{CAP}$ is driven to the ground potential ("7"). The timer circuit remains in this state until the voltage control loop turns on the high-side switch again ("8").

It is instructive to note that the high-side off signal HS_off generated by the comparator 90 is a pulse signal or a one-shot signal that is asserted only momentarily to trigger the high-side turn off action. As soon as the high-side turn-on signal is deasserted and the low-side turn-on signal is asserted, the Discharge signal is engaged to discharge the capacitor voltage $V_{CAP}$ which will cause the comparator 90 to deassert the HS_off signal.

Returning to FIG. 3, with the switching regulator 50 thus constructed to include the voltage control loop and the frequency control loop, the switching regulator responds to changing load conditions using the voltage control loop which provides fast transient response while maintaining a switching frequency within a given range using the frequency control loop. In operation, once the high-side switch is turned on by the voltage control loop, the time that the high-side switch can remain on is a function of the current $I_{Charge}$ which is generated by the frequency control loop. When the switching frequency deviates largely from the desired reference frequency, a large current $I_{Charge}$ is generated. When the switching frequency deviates only slightly from the desired reference frequency, a small current $I_{Charge}$ is generated. When the current $I_{Charge}$ is large, the charging time for the timing capacitor Cx to reach voltage Vx is short and the high-side switch on-time is reduced. When the current $I_{Charge}$ is small, the charging time for the timing capacitor Cx to reach voltage Vx is long and the high-side switch on-time is extended. In this manner, the voltage control loop of the switching regulator regulates the output voltage to the desired voltage level while the frequency control loop of the switching regulator regulates the switching frequency to a desired frequency value or to be within a desired frequency range.

It is imperative to note that FIG. 4 is illustrative only. The Ton timer circuit can have other configurations in other embodiments of the present invention. For example, in other embodiments, the Ton timer circuit can be configured to operate in opposite polarities relative to current $I_{Charge}$. In one example, the Ton timer circuit can be configured to increase the high-side switch on-time with increasing current $I_{Charge}$ and to decrease the high-side switch on-time with decreasing current $I_{Charge}$. The exact current and voltage polarities used in Ton timer circuit 55 of FIG. 4 is illustrative only and not intended to be limiting.

With the Ton timer circuit thus constructed in FIG. 4, the buck switching regulator 50 operates as a voltage-controlled oscillator for the phase-locked loop based frequency control loop. More specifically, the charge on the timing capacitor Cx can be expressed as:

$$Q = I_{Charge} \cdot T_{ON} = Cx \cdot Vx$$

The high-side switch on-time Ton can thus be expressed as:

$$T_{ON} = \frac{Cx \cdot Vx}{I_{Charge}}.$$

For buck switching regulator, the switching frequency $f_{SW}=1/T_{SW}$ and the output voltage $V_{OUT}$ is given as:

$$V_{OUT} = D \cdot V_{IN} = \frac{T_{ON}}{T_{SW}} V_{IN} = T_{ON} \cdot f_{SW} \cdot V_{IN}, \text{ and}$$

$$f_{SW} = \frac{V_{OUT}}{V_{IN}} \cdot \frac{1}{T_{ON}} = \frac{V_{OUT}}{V_{IN}} \cdot \frac{I_{Charge}}{Cx \cdot Vx}.$$

Given that:

$$I_{Charge} = \alpha V_{CTRL},$$

$$f_{SW} = \frac{V_{OUT}}{V_{IN}} \cdot \frac{1}{Cx \cdot Vx} \cdot \alpha V_{CTRL}.$$

Accordingly, the buck switching regulator becomes a voltage-controlled oscillator (VCO) and the gain of the VCO is given as:

$$VCO \text{ gain} = \frac{f_{SW}}{V_{CTRL}} = \alpha \cdot \frac{V_{OUT}}{V_{IN}} \cdot \frac{1}{Cx \cdot Vx}.$$

Figure 6:
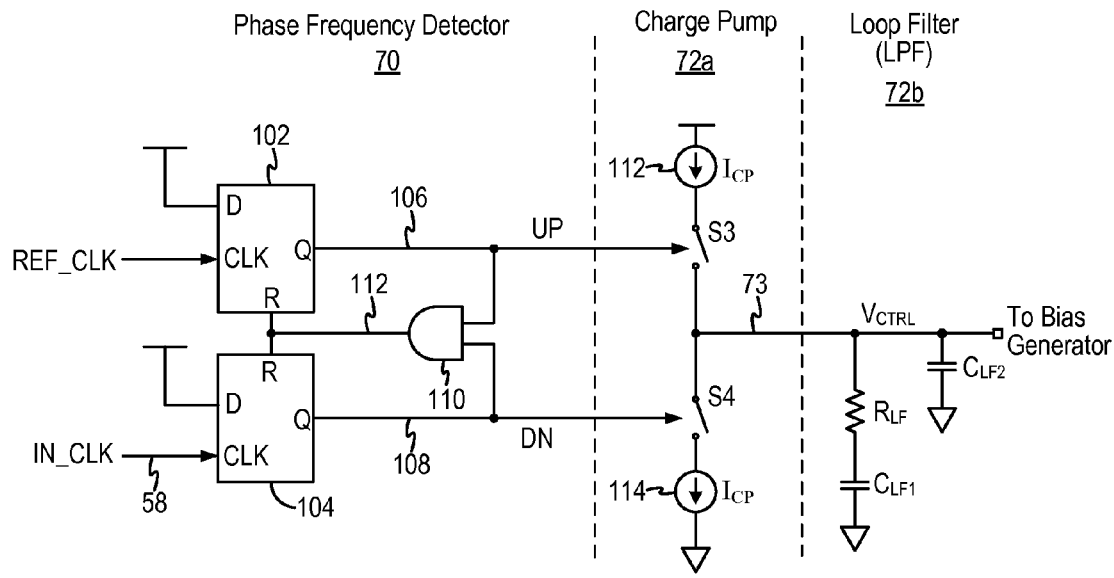
FIG. 6 is a circuit diagram of the frequency control loop in the switching regulator of FIG. 3 in embodiments of the present invention.

FIG. 6 is a circuit diagram of the frequency control loop in the switching regulator of FIG. 3 in embodiments of the present invention. Referring to FIG. 6, the phase frequency detector 70 is implemented using two D-flip-flops 102 and 104. Both D-flip-flips have their data input terminal connected to a positive power supply voltage. The first D-flip-flop 102 receives the reference clock REF_CLK having the reference frequency $f_{REF}$ at the clock input terminal while the second D-flip-flop 104 receives an input clock IN_CLK having an input frequency $f_{IN}$ related to the switching output voltage $V_{SW}$. The input clock can be the switching output voltage $V_{SW}$, or a replica of the switching output voltage, with or without frequency division being applied to the switching frequency $f_{SW}$. The output of the first D-flip-flop 102 is the Up control signal (node 106) and the output of the second D-flip-flop 104 is the Down control signal (node 108). The Up and Down control signals are connected to a logical AND gate 110 and coupled back to the D-flip-flops 102, 104 to drive the reset terminals of the two flip-flops. In operation, when the input clock is in phase with the reference clock, the two flip-flops are put in reset state and the Up and Down control signals are not asserted. When the input clock is out of phase with the reference clock, either faster or slower, the Up control signal or the Down control signal will be asserted to charge or discharge the charge pump.

The charge pump circuit 72a includes a first current source 112, a first switch S3, a second switch S4 and a second current source 114, all connected in series between the power supply voltage and ground. Switch S3 is controlled by the Up control signal while switch S4 is controlled by the Down control signal, both generated from the phase and frequency detector 70 in response to the difference between the reference frequency $f_{REF}$ and the input frequency $f_{IN}$. When the Up control signal is asserted to close switch S3, the charge pump current $I_{CP}$ from the first current source 112 charges the control voltage node 73. When the Down control signal is asserted to close switch S4, the charge pump current $I_{CP}$ from the second current source 114 discharges the control voltage node 73. Switches fS3 and S4 are not turned on at the same time. The loop filter 72b, usually a low pass filter, is formed by the serial connection of a resistor $R_{LF}$ and a capacitor $C_{LF1}$ coupled to the control voltage node 73 to low-pass filter the voltage at the control voltage node 73 to generate the control voltage $V_{CTRL}$. In some cases, the loop filter 72b may include an additional capacitor $C_{LF2}$ coupled to the control voltage node 73. The control voltage $V_{CTRL}$ is then used to drive the bias generator to generate the current $I_{Charge}$.

FIG. 6 is illustrative only and other circuit configurations can be used to realize the phase-locked loop based frequency control loop of the switching regulator of the present invention.

Figure 7:
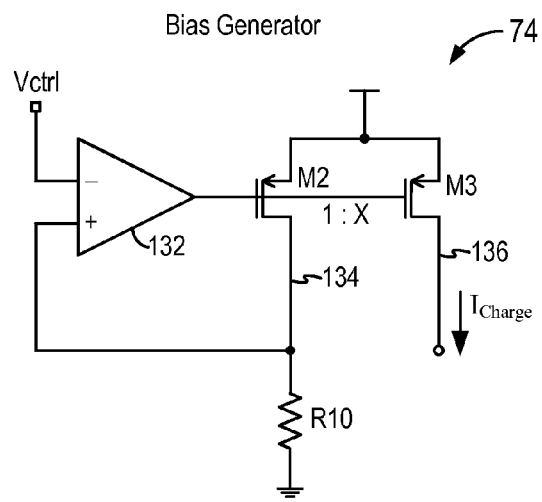
FIG. 7 is circuit diagram of a bias generator which can be incorporated in the frequency control loop of the switching regulator of FIG. 3 in embodiments of the present invention.

FIG. 7 is circuit diagram of a bias generator which can be incorporated in the frequency control loop of the switching regulator of FIG. 3 in embodiments of the present invention. Referring to FIG. 7, the bias generator 74 is configured as a unity gain amplifier with a current mirror. The control voltage $V_{CTRL}$ from the charge pump and loop filter is coupled to the negative input terminal of a differential amplifier 132. The output of the differential amplifier 132 is coupled to drive a PMOS current mirror formed by PMOS transistors M2 and M3. The drain terminal (node 134) of PMOS transistor M2 is connected to a resistor R10 and is also connected back to the positive input terminal of the differential amplifier 132 to form a feedback loop. The differential amplifier 132 driving transistor M2 causes a current to flow in resistor R10. PMOS transistor M3 mirrors the current flowing in resistor R10 to generate the output current $I_{Charge}$ at the output node 136. Transistors M2 and M3 can have a 1:X transistor ratio so that the current $I_{Charge}$ is a scaled version of the current flowing in resistor R10.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A buck switching regulator being configured to receiving an input voltage and to generate a regulated output voltage, the buck switching regulator controlling a high-side switch and a low-side switch based on a feedback control scheme to drive a switch output node between the high-side switch and the low-side switch for generating a switching output voltage, the switch output node being coupled to an LC filter to generate the regulated output voltage having a substantially constant magnitude on an output node, the buck switching regulator comprising:
  a controller circuit configured to generate a high-side turn-on signal and a low-side turn-on signal, the high-side turn-on signal being asserted to turn on the high-side switch and the low-side turn-on signal being asserted to turn on the low-side switch, the high-side turn-on signal and the low-side turn-on signal being asserted alternately to turn on the high-side switch and the low-side switch alternately to generate the switching output voltage at the switching output node between the high-side switch and the low-side switch, the switching output voltage having a switching frequency defined by the on-time and the off-time of the high-side switch;
  a voltage control loop configured to cause the controller circuit to assert the high-side turn-on signal to turn on the high-side switch in response to a feedback signal being equal to or less than a reference signal, the feedback signal being indicative of the regulated output voltage; and a frequency control loop configured to cause the controller circuit to deassert the high-side turn-on signal to turn off the high-side switch in response to a frequency correction signal related to a phase difference between an input frequency and a reference frequency, the frequency control loop being configured to receive the switching output voltage from the switch output node as an input clock signal, the input clock signal being derived from the switching output voltage and the input frequency of the input clock signal being the switching frequency or being a divided down frequency of the switching frequency, wherein the voltage control loop is configured to adjust a duty cycle of the high-side switch to maintain the regulated output voltage at a desired voltage level while the frequency control loop is configured to adjust the on-time of the high-side switch to maintain the switching frequency to within a frequency range of the reference frequency.

2. The buck switching regulator of claim 1, wherein the voltage control loop comprises:

a gain circuit configured to generate the feedback signal indicative of the regulated output voltage;

a ripple generation circuit configured to generate a ripple signal using the switching output voltage and to inject the ripple signal to the feedback signal; and a comparator configured to receive the feedback signal and the reference signal and to generate a comparator output signal having an output level indicative of the difference between the feedback signal and the reference signal, wherein the comparator asserts the comparator output signal in response to the feedback signal falling below the reference signal, the comparator output signal being coupled to the controller circuit to cause the controller circuit to assert the high-side turn-on signal to turn on the high-side switch.

3. The buck switching regulator of claim 2, wherein the gain circuit comprises a voltage divider having a divider ratio, the divider ratio having a value of 1 or less than 1.

4. The buck switching regulator of claim 1, wherein the frequency control loop comprises:

a phase and frequency detector configured to receive the input clock signal having the input frequency and a reference clock signal having the reference frequency and to generate one or more control signals, the one or more control signals being indicative of the phase difference between the input frequency and the reference frequency, the input frequency being related to the switching frequency;

a charge pump configured to receive the one or more control signals and a charge pump current, the charge pump being configured to charge or discharge a control voltage node using the charge pump current in response to the one or more control signals, a control voltage being generated at the control voltage node;

a loop filter couple to the control voltage node to filter the control voltage; and a bias generator configured to receive the control voltage and to generate the frequency correction signal as a function of the control voltage.

5. The buck switching regulator of claim 4, wherein the loop filter comprises a low pass filter.

6. The buck switching regulator of claim 4, wherein the frequency correction signal comprises a frequency correction current signal.

7. The buck switching regulator of claim 4, wherein the frequency control loop is configured to adjust the on-time of the high-side switch to maintain the switching frequency to be equal to or be proportional to the reference frequency.

8. The buck switching regulator of claim 4, wherein the controller circuit comprises an on-time timer circuit, the on-time timer circuit comprising:

a timing capacitor coupled between a capacitor voltage node and a ground potential, the frequency correction current signal being provided to the capacitor voltage node to charge the timing capacitor, a capacitor voltage develops at the capacitor voltage node;

a discharge circuit configured to discharge the capacitor voltage node in response to a discharge signal, the discharge signal being asserted to discharge the capacitor voltage node during an off-time of the high-side switch and the discharge signal being deasserted to allow the timing capacitor to be charged up during an on-time of the high-side switch; and a second comparator configured to compare the capacitor voltage and a timer reference voltage and to generate a high-side turn-off signal as an output signal, the second comparator asserting the high-side turn-off signal in response to the capacitor voltage reaching or exceeding the timer reference voltage, wherein the on-time timer circuit provides the high-side turn-off signal to the controller circuit to cause the controller circuit to deassert the high-side turn-on signal.

9. A method in buck switching regulator receiving an input voltage and controlling a high-side switch and a low-side switch using a feedback control scheme to drive a switch output node for generating a switching output voltage having a switching frequency defined by the on-time and the off-time of the high-side switch, the switch output node being coupled to an LC filter circuit to generate a regulated output voltage having a substantially constant magnitude on an output node, the method comprising:

generating a feedback signal indicative of the regulated output voltage;

generating a ripple signal using the switching output voltage;

injecting the ripple signal to the feedback signal;

generating a comparator output signal indicative of the difference between the ripple injected feedback signal and a reference signal;

generating a frequency correction signal indicative of a phase difference between an input frequency of an input clock signal and a reference frequency, the input clock signal being derived from the switching output voltage at the switching output node, the input frequency being the switching frequency or being a divided down frequency of the switching frequency;

generating a signal to turn on the high-side switch in response to the comparator output signal having a value indicating the feedback signal is equal to or less than the reference signal; and generating a signal to turn off the high-side switch in response to the frequency correction signal.

10. The method of claim 9, wherein generating a signal to turn on the high-side switch in response to the comparator output signal having a value indicating the feedback signal is equal to or less than the reference signal comprises:

generating a signal to turn on the high-side switch in response to the comparator output signal having a value indicating the feedback signal is equal to or less than the reference signal to maintain the regulated output voltage at a desired voltage level.

11. The method of claim 9, wherein generating a signal to turn off the high-side switch in response to the frequency correction signal comprises:

generating a signal to turn off the high-side switch in response to the frequency correction signal to maintain the switching frequency to within a frequency range of the reference frequency.

12. The method of claim 11, wherein generating a signal to turn off the high-side switch in response to the frequency correction signal to maintain the switching frequency to within a frequency range of the reference frequency comprises:
generating a signal to turn off the high-side switch in response to the frequency correction signal to maintain the switching frequency to be equal to or be proportional to the reference frequency.

13. The method of claim 9, wherein generating a feedback signal indicative of the regulated output voltage comprises dividing the regulated output voltage by a divider ratio to generate the feedback signal, the divider ratio having a value of 1 or less than 1.

14. The method of claim 9, wherein generating a frequency correction signal indicative of a phase difference between an input frequency and a reference frequency comprises generating the frequency correction signal using a phase-locked loop scheme.

15. The method of claim 9, wherein the frequency correction signal comprises a frequency correction current signal.

* * * * *